R. NEISCH.
Improvement in Cigar-Machines.
No. 129,489. Patented July 16, 1872.
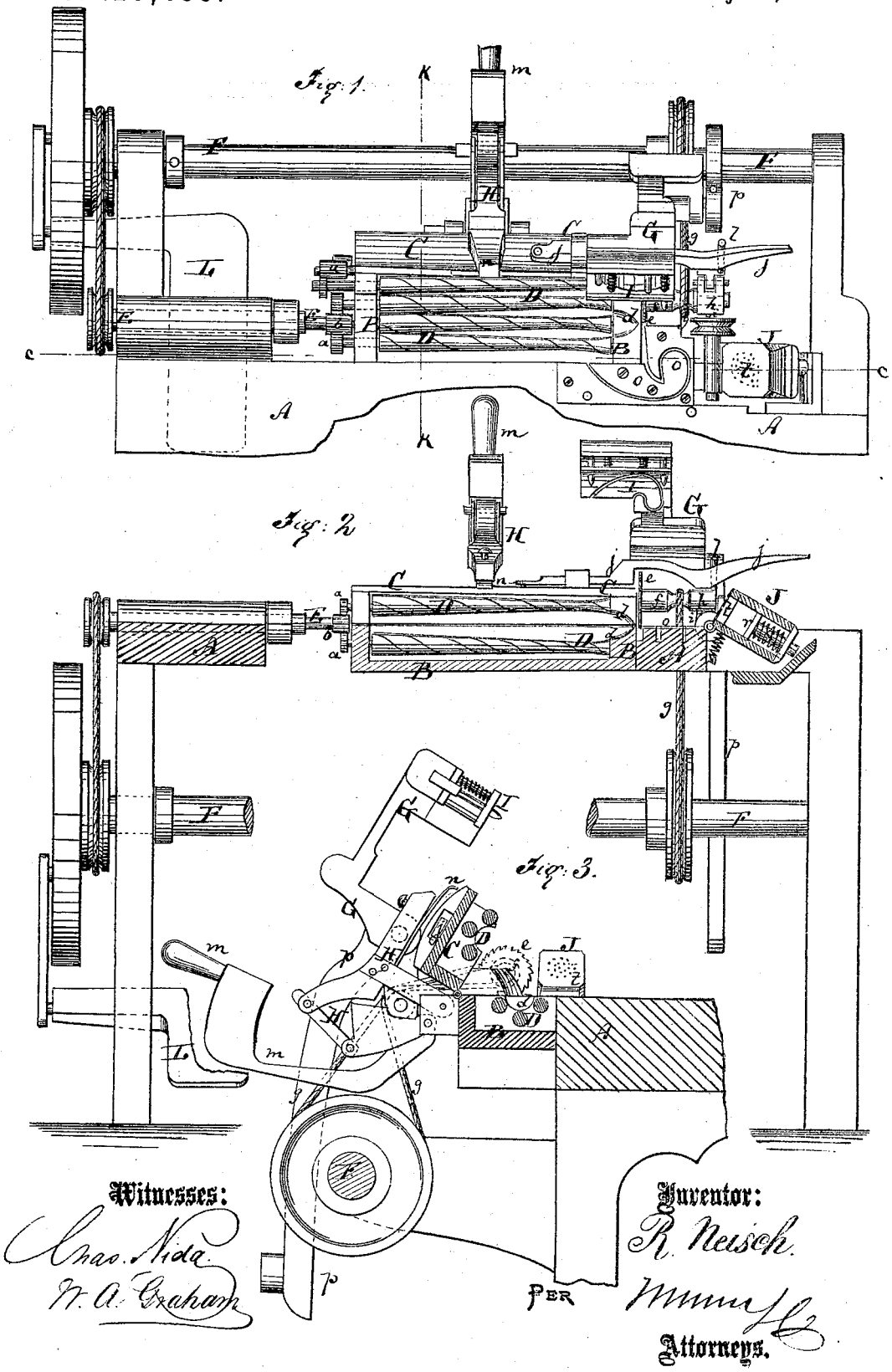

129,489

UNITED STATES PATENT OFFICE.

ROBERT NEISCH, OF ALLENTOWN, PENNSYLVANIA.

IMPROVEMENT IN CIGAR-MACHINES.

Specification forming part of Letters Patent No. 129,489, dated July 16, 1872.

Specification describing a new and Improved Cigar-Machine, invented by ROBERT NEISCH, of Allentown, in the county of Lehigh and State of Pennsylvania.

Figure 1 represents a top view of my improved cigar-machine. Fig. 2 is a longitudinal vertical section of the same on the line $c\ c$, Fig. 1. Fig. 3 is a vertical transverse section of the same on the line $k\ k$, Fig. 1.

Similar letters of reference indicate corresponding parts.

This invention relates to several improvements in the cigar-machine for which Letters Patent of the United States were granted to me December 20, 1870, and numbered 110,270. The present invention has for its object materially to simplify the devices shown in my former invention, and thereby to reduce the difficulty and expense of producing the machine and operating the same. The invention consists, first, in the use of a rotary serrated cutter hanging in spring bearings, and intended to cut off whatever may project beyond the top of the cigar; second, in the application, to the upper mold-box lid, of a projecting arm, which serves to apply the aforesaid rotary cutter only while the mold is closed; third, in providing the frame which carries the scroll-shaped serrated knife for cutting the tip-end of the wrapper with a weighted arm, whereby it is raised automatically off the platform, unless when forced down for cutting, so it will not interfere with the operation of the machine; finally, the invention consists in a new construction of paster, containing a spring-plunger for forcing the gum through small apertures in the end, all as hereinafter more fully described.

A in the drawing represents the table of the machine, of suitable size and shape. At one side of the same is rigidly affixed the lower half B of the mold, to which the upper half or lid C is hinged. D D are the rollers for winding the wrapper about the filler. These rollers are so shaped with concave sides that between them a cavity of the form of the cigar to be made is formed. Several of these rollers have their bearings in the ends of the box B; others in those of the lid C. They all carry pinions $a\ a$ at one end, matching into each other, and geared together with a pinion, $b$, on a rotary shaft, E. When the lid C is closed the pinions $a$ on its rollers will also come in gear with the shaft E. The latter receives rotary motion, by belt connection or otherwise, from a driving-shaft F, which is revolved by means of a treadle, L, or other mechanism. Each of the rollers D is grooved spirally from end to end to prevent the cigar, while being rolled, from moving back toward the larger end of the opening, which it would be apt to do without these grooves. The upper end of mold contains the concave end plates or pieces $d\ d$, described in my former Letters Patent, and fully shown in Figs. 1 and 2. Close against the upper or tip end of the mold works a revolving knife, $e$, having a serrated cutting-edge and serving to cut off so much of the wrapper as may project beyond the proper tip or point of the cigar. This knife $e$ is mounted on an arbor, $f$, which receives rotary motion, by a band or belt, $g$, from the shaft F, and which hangs in a hinged arm or frame, $h$. A spring, $i$, swings said frame up sufficiently high to prevent the knife $e$ from cutting, unless an arm, $j$, on the hinged lid C, bears upon the frame $h$ and forces it down sufficient to bring the cutter in position for action. The arm or handle $j$ is pivoted to the top of the lid, and has a downward projection for contact with the hinged frame $h$. Whenever the lid is to be swung open the handle $j$ is first swung back by hand to release the frame $h$, and is then used to open the lid, striking, when the lid is opened, a pin, $l$, projecting from $h$, whereby it is again swung in position for depressing $h$ should the lid be closed. The lid C is connected with a series of toggle-levers, H H, which unite it to the side of the table A and with a handle, $m$. By their means the lid is held securely down and the mold closed, though it can be conveniently opened, a hook, $n$, extending over the front edge of the lid to enable its being drawn open. I is the scroll-shaped cutter, constructed substantially as described in my above-named Letters Patent, and arranged to operate above the platform $o$, which has the scroll-shaped groove or slot, also as described in my aforementioned Letters Patent. In the present case the cutter I is applied to a swinging frame, G, which has a weighted arm, $p$, whereby the cutter is held elevated above the platform $o$ to be clear of the same, unless forced by hand upon the same. J is the paster, in form of a small hollow box, which is hinged to the table close to the cutter-platform o, as shown. Within this box J is a plunger, r, crowded, by a spring, s, toward the perforated end plate t of the box. The gum is, after removal of plate t or otherwise, filled into the box and gradually squeezed out by means of the spring plunger. Whenever the paster is to be used it is swung by hand so as to bring its perforated end t on the wrapper, which covers the platform o and applies gum thereto. A spring, shown in Fig. 2, draws it back and out of the way as soon as it is released.

The operation of the machine is almost entirely carried on by hand. The filler, after having at another place been completed, is put within the mold, the wrapper spread on the table with one end in the mold, and the mold then closed. The shafts are then rotated and the wrapper wound on. When only the end of the wrapper remains on the platform o the cutter is forced down to shape its end, the paster next applied, and the winding up continued until the cigar is completed. The serrated rotary knife acts all the while the mold is closed, automatically cutting off the surplus which may project through the end of the mold.

Having thus described my invention, I claim as new and desire to secure by Letters Patent—

1. The serrated rotary knife e, hung in a hinged frame, h, which is combined with the spring i, substantially as set forth.

2. The combination of the handle j on the mold-lid C with the swinging frame h of the rotary knife e, as set forth.

3. The toggle-levers H H, handle m, and hook n, applied to the cigar-machine, in combination with the lid C, as set forth.

4. The scroll-knife I applied to the swinging frame G, in combination with the weighted arm p, as specified.

5. The paster J, containing the perforated end plate t and the spring plunger r, substantially as and for the purpose specified.

ROBERT NEISCH.

Witnesses:
GEORGE W. BEYERL,
H. ODENHEIMER.